(12) United States Patent
Lee et al.

(10) Patent No.: US 8,909,658 B2
(45) Date of Patent: Dec. 9, 2014

(54) METHOD AND APPARATUS FOR MANAGING MULTIMEDIA CONTENT STORED IN DIGITAL MULTIMEDIA DEVICE

(75) Inventors: Hye-Soo Lee, Seoul (KR); Yong-sung Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 761 days.

(21) Appl. No.: 11/516,570

(22) Filed: Sep. 7, 2006

(65) Prior Publication Data

US 2007/0061378 A1 Mar. 15, 2007

(30) Foreign Application Priority Data

Sep. 14, 2005 (KR) ........................ 10-2005-0085727

(51) Int. Cl.
*G06F 17/30* (2006.01)
(52) U.S. Cl.
CPC .... *G06F 17/30017* (2013.01); *G06F 17/30011* (2013.01)
USPC ........................................................ 707/758
(58) Field of Classification Search
CPC .......... G06F 17/3011; G06F 17/30017; G06F 17/2211; G06F 3/0626; G06F 7/5057
USPC .............. 707/758, 767, 770, 784; 725/58, 90, 725/134, 142
See application file for complete search history.

(56) References Cited

U.S. PATENT DOCUMENTS

| 6,427,152 | B1 * | 7/2002 | Mummert et al. ................... 1/1 |
| 6,654,757 | B1 * | 11/2003 | Stern ................................... 1/1 |
| 6,920,281 | B1 * | 7/2005 | Agnibotri et al. ............ 386/295 |
| 7,281,084 | B1 * | 10/2007 | Todd et al. ..................... 711/108 |
| 7,502,849 | B2 * | 3/2009 | Roberts et al. ................ 709/224 |
| 7,590,058 | B1 * | 9/2009 | Cherchali et al. ............. 370/230 |
| 2002/0110149 | A1 * | 8/2002 | Roberts et al. ................ 370/477 |
| 2003/0110503 | A1 * | 6/2003 | Perkes ............................ 725/86 |
| 2004/0103437 | A1 * | 5/2004 | Allegrezza et al. ............ 725/95 |
| 2004/0172650 | A1 * | 9/2004 | Hawkins et al. ................ 725/46 |

(Continued)

FOREIGN PATENT DOCUMENTS

| CN | 1395794 A | 2/2003 |
| JP | 2001-126449 A | 5/2001 |

(Continued)

OTHER PUBLICATIONS

Communication dated Oct. 25, 2011, issued by the Japanese Patent Office in corresponding Japanese Patent Application No. 2006-248657.

*Primary Examiner* — Ajay Bhatia
*Assistant Examiner* — Fatima Mina
(74) *Attorney, Agent, or Firm* — Sughrue Mion, PLLC

(57) ABSTRACT

A method and apparatus are provided for automatically selecting and deleting unimportant content in order to secure a storage space in a digital multimedia device. The multimedia content is classified into content in which a storage period is set and content in which a storage period is not set and then the content is stored. The size of the content occupying a storage space in each storage type is automatically calculated to analyze a user's pattern of using the storage space when the storage space is insufficient, and content to be deleted is selected according to the analyzed pattern. Thus, it is possible to prevent the content which the user does not want to delete from being deleted and to eliminate the need for the user to individually manage the content.

18 Claims, 6 Drawing Sheets

(56) References Cited

U.S. PATENT DOCUMENTS

| | | | |
|---|---|---|---|
| 2005/0204384 A1* | 9/2005 | Yuen et al. | 725/43 |
| 2005/0232210 A1* | 10/2005 | Karaoguz et al. | 370/338 |
| 2006/0085441 A1* | 4/2006 | Funk et al. | 707/100 |
| 2007/0044010 A1* | 2/2007 | Sull et al. | 715/500.1 |

FOREIGN PATENT DOCUMENTS

| | | |
|---|---|---|
| JP | 2002-093119 A | 3/2002 |
| JP | 2003-289490 A | 10/2003 |
| KR | 10-2004-0080655 A | 9/2004 |
| KR | 10-2005-0034578 A | 4/2005 |

* cited by examiner

METHOD AND APPARATUS FOR MANAGING MULTIMEDIA CONTENT STORED IN DIGITAL MULTIMEDIA DEVICE

CROSS-REFERENCE TO RELATED PATENT APPLICATION

This application claims priority from Korean Patent Application No. 10-2005-0085727, filed on Sep. 14, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to managing multimedia content, and more particularly, to efficiently managing multimedia content stored in a restricted storage space of a multimedia device.

2. Description of the Related Art

Digital multimedia devices, such as personal video recorders (PVRs), home audio/video (AV) centers, and personal media players (PMPs), which store and play various multimedia content including music, pictures, and moving pictures and include a mass storage device such as a hard disk drive (HDD) and a flash memory, are actively being developed. As multimedia compression technologies have been improved, the amount of content which can be stored in a digital multimedia device has increased. Furthermore, since the multimedia devices can share data over a network, an individual can transmit or share multimedia content over the network. Thus, the multimedia devices can store several thousands or several tens of thousands of pieces of content. However, although large capacity storage devices have been developed, the storage capacity is still not sufficient to store various and large pieces of content. Accordingly, it has become gradually difficult for a user to search for desired content.

Therefore, in order to ensure sufficient storage space, the user must search for several thousands or several tens of thousands of pieces of content and delete unimportant or unnecessary content.

However, it is difficult or troublesome to select unimportant content as well as to determine the kinds of content. In particular, this operation is even more difficult in the case of most mobile or home multimedia devices which have input units such as a simple button or a remote controller, instead of a keyboard or a mouse.

FIG. 1 illustrates a configuration of a related art digital recorder.

As shown in FIG. 1, the general digital recorder includes a storage (HDD) 10, a record/play system 11, and a microcomputer 12, and a memory 13.

In order to manage multimedia content stored in the HDD 10, a deletion recommendation list is displayed such that a user can easily select and delete a recorded program having low importance from the HDD 10 when necessary. When recording and managing last play time information when recording/playing a program, the deletion recommendation list is generated in the order of the last play time.

The microcomputer 12 records and manages the last play time (Last_Play_Time) information in the memory 13 when a program is recorded in the HDD 10 or a recorded program is played.

Hereinafter, a method of managing data in a conventional digital multimedia device will be described in detail with reference to FIG. 2.

The microcomputer 12 sets an operation mode of the digital recorder to a data record mode (21), controls the record/play system 11 to process and encode an external input signal to data suitable for recording, and records the data in the HDD 10 (22), according to a request of the user.

The microcomputer 12 continuously monitors the storage capacity of the HDD 10 (23) while performing the data record operation. If the storage capacity of the HDD 10 is insufficient or exceeds an allowable storage capacity previously set during the data record operation, the microcomputer 12 controls the record/play system 11 to pause the data record operation and searches for the last play time information of the recorded programs stored in the memory 13 (24). The microcomputer 12 generates the deletion recommendation list having record program names and last play times in the order of the last play time and displays the deletion recommendation list on a screen of an external connection device such as a television such that the user can select and delete any one of the recorded programs (25).

When the user selects any one of the recorded programs, the microcomputer 12 controls the record/play system 11 to delete the recorded program which is selected, and then resumes the paused data record operation 27.

However, making the deletion recommendation list in the order of the last play time may not be suitable to the user. For example, when the content is a wedding video or a video of a birthday party for a one-year-old baby, which the user wants to store, the content must not be deleted only because the content was not played for a long time.

Alternatively, there is a method of automatically deleting content using information on whether the content is played or how many times the content is played. However, this method may be also unsuitable. For example, the user may watch a news program one time and delete the news program. However, since a music video might be repeatedly watched by the user, the music video must not be deleted.

Alternatively, there is a method of allowing a user to select any one of "unconditional storage", "automatic deletion after watching", "automatic deletion after a predetermined storage period", and "unconditional deletion" options and managing the content according to the user's selection.

This method can prevent the content from being inadvertently deleted based on the user's intention, but is troublesome because the user must specify the management levels of the content. In addition, if the user selects the "unconditional storage" or "automatic deletion after watching" option, the content which can be deleted may not exist when any content must be deleted in order to ensure adequate storage space.

As the amount of content that can be stored in digital media devices has increased, the method of automatically selecting unnecessary content, displaying the unnecessary content to the user, and automatically deleting the unnecessary content has become very important. However, according to the prior art, desired content may be accidentally deleted and the user has to manage the content.

SUMMARY OF THE INVENTION

The present invention provides a method and apparatus for automatically selecting and deleting unimportant content in order to ensure a storage space in a digital multimedia device.

According to an aspect of the present invention, there is provided a method of managing multimedia content including classifying the multimedia content into a first type of content in which a storage period is not set and a second type of content in which a storage period is set and storing the first and second types of content; determining any one of the first type of content and the second type of content as content to be deleted, based on the total size of the stored multimedia content; and deleting the determined content.

The determining of the first type of content and the second type of content as content to be deleted may include calculating the sum of an average of maximum values of the sizes of the second type of content during a predetermined period before the total size of the stored multimedia content exceeds a first critical threshold and the size of the first type of content when the total size of the stored multimedia content exceeds the first critical threshold; and determining that the second type of content is deleted when the calculated size does not exceed the first critical threshold.

The method further includes determining whether the size of the first type of content exceeds a second critical threshold when the calculated size exceeds the first critical threshold, determining that the first type of content is deleted if the size of the first type of content exceeds the second critical threshold, and determining that the second type of content is deleted if the size of the first type of content does not exceed the second critical threshold.

According to another aspect of the present invention, there is provided a computer-readable medium having embodied thereon a computer program for performing the method of managing multimedia content.

According to another aspect of the present invention, there is provided an apparatus for managing multimedia content including a content setting unit which classifies the multimedia content into a first type of content in which a storage period is not set and a second type of content in which a storage period is set; a content storing unit which stores the first and second types of content classified by the content setting unit; a content managing unit which determines any one of the first type of content and the second type of content as content to be deleted, based on the total size of the multimedia content stored in the content storing unit; and a deleting unit which deletes any type of content determined by the content managing unit.

The content managing unit may include a calculating unit which calculates the sum of an average of maximum values of the sizes of the second type of content during a predetermined period before the total size of the multimedia content stored in the content storing unit exceeds a first critical threshold and the size of the first type of content when the total size of the stored multimedia content exceeds the first critical threshold; and a determining unit which determines that the second type of content is deleted when the size calculated by the calculating unit does not exceed the first critical threshold.

The apparatus may further include a judging unit which determines whether the size of the first type of content exceeds a second critical threshold when the size calculated by the calculating unit exceeds the first critical threshold, the determining unit may determine that the first type of contents is deleted if the size of the first type of content exceeds the second critical threshold, and determine that the second type of content is deleted if the size of the first type of content does not exceed the second critical threshold.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
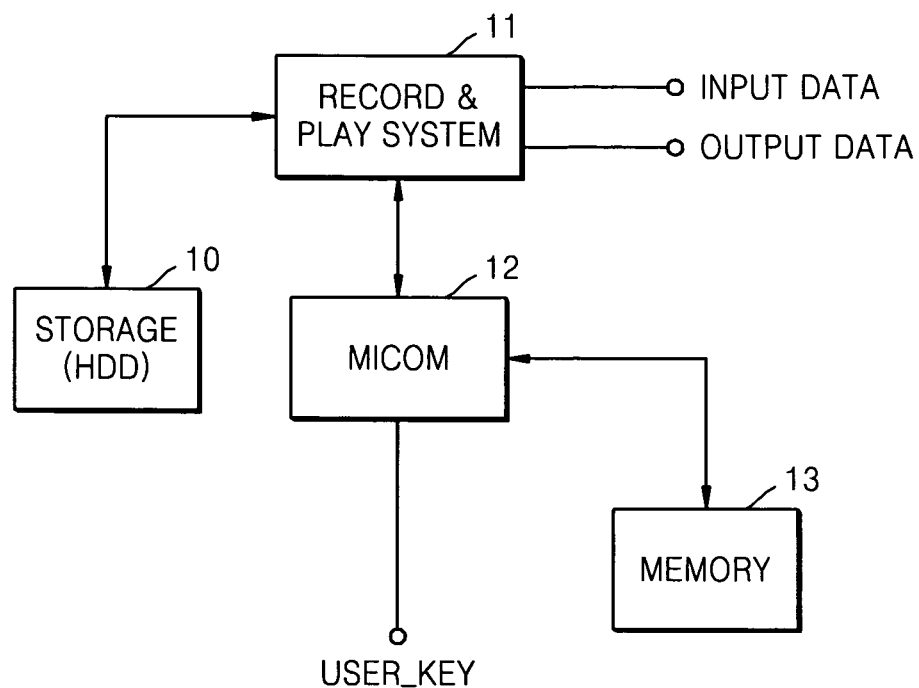
FIG. 1 illustrates a configuration of a related art digital recorder.
Figure 2:
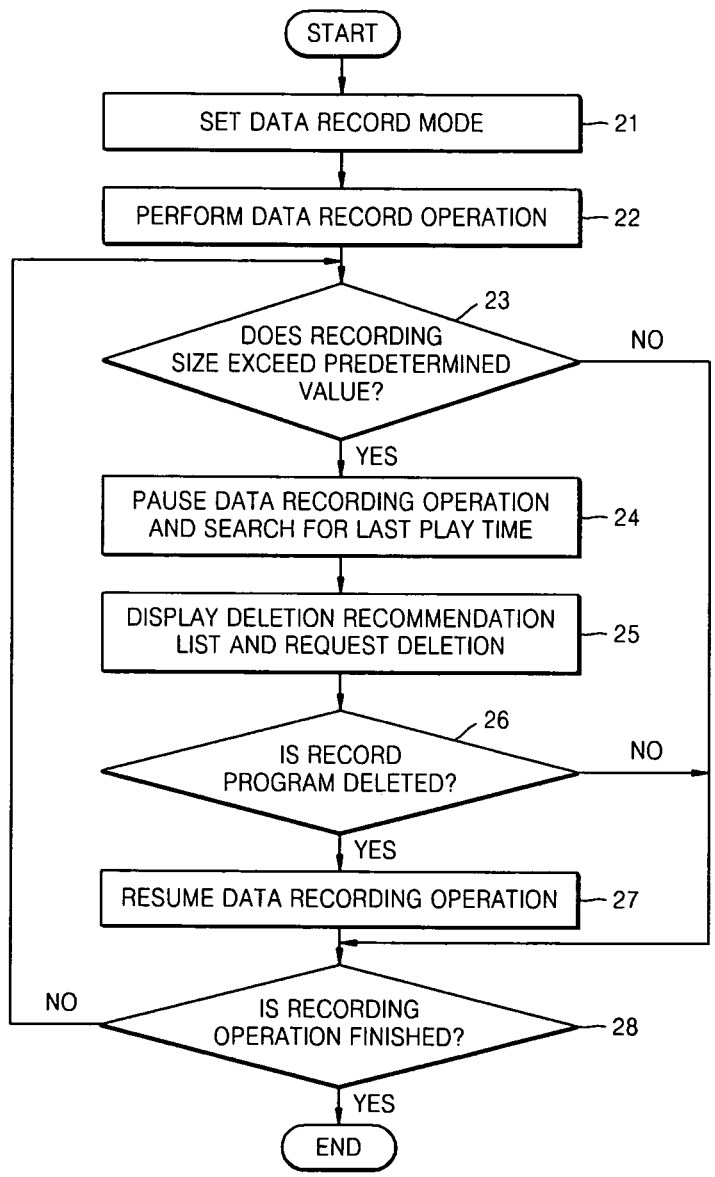
FIG. 2 is a flowchart illustrating a method of managing data in a conventional digital multimedia device.
Figure 3:
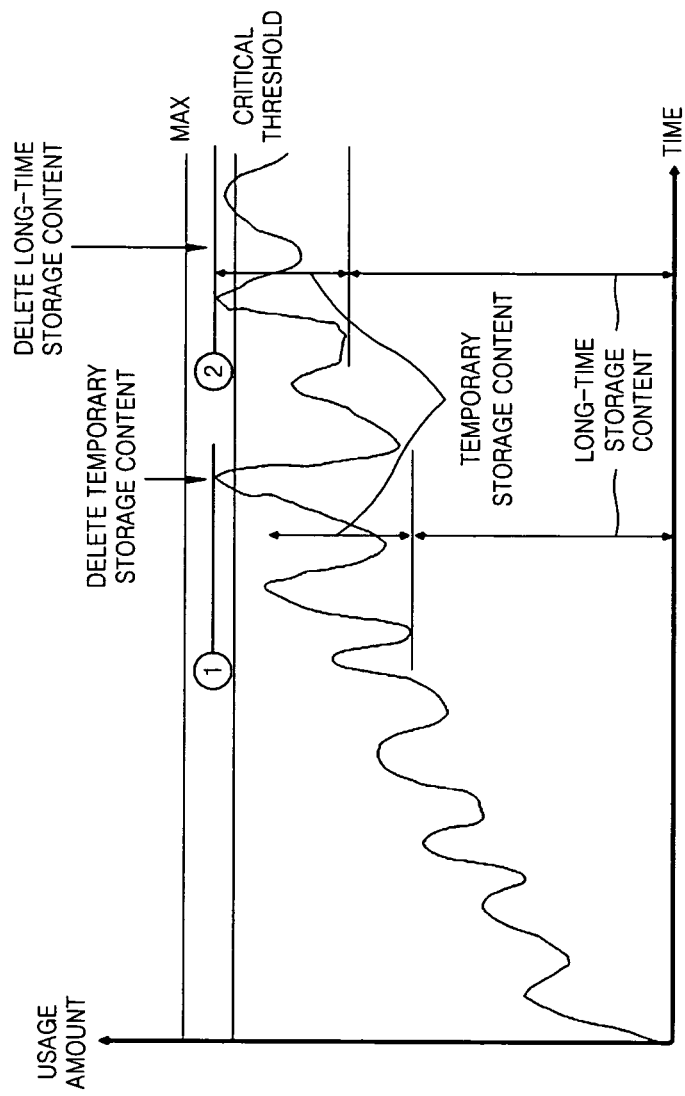
FIG. 3 is a graph illustrating a method of managing multimedia content according to an exemplary embodiment of the present invention.

FIG. 3 is a graph illustrating a method of managing multimedia content according to an exemplary embodiment of the present invention.

The graph represents changes in the usage amount of a storage space in a digital multimedia device according to an exemplary embodiment of the present invention. In order to select content to be deleted from the digital multimedia device, it must be determined whether a user wants to play the content in the future. According to the exemplary embodiments of the present invention, the content is classified into long-time storage content, which is to be permanently stored, and temporary storage content, which is to be temporarily stored.

The long-time storage content is stored permanently or as long as possible in the multimedia device and includes private content directly created by the user, such as pictures created using a digital camera or moving pictures created using a camcorder. For example, when the user wants to permanently store a wedding video, a video of a birthday party for a one-year-old baby, and a travel video, the user may set these pieces of content as the long-time storage content.

Meanwhile, the temporary storage content may be deleted after it has been played several times and may include a video, a music file, etc., recorded from television or radio, or downloaded over the Internet. For example, when an MP3 file for studying English downloaded over the Internet or a recorded broadcasting program must be stored during a predetermined period and played once or several times, they may be set to temporary storage content. The storage period of the temporary content may be set depending on the kind of the content such as music, pictures, or moving pictures. Alternatively, the storage period of the temporary content may be set to predetermined days, for example, one day, three days, or seven days after a recording time, or predetermined days, for example, one day, three days, or seven days after a playing time.

In the multimedia device which can create content through recording, such as a PVR, the user may set external input content to the long-time storage content by default.

The user may directly set and change storage types of the content, storage reference dates of the temporary storage content, and storage periods of the temporary storage content through a user interface. Information on the storage types, the storage periods, and the storage reference dates of the content is recorded as metadata.

When the content stored in the digital media device is classified as the long-time storage content and the temporary storage content, a storage area of the content can be logically divided into an area for storing the long-time storage content and an area for storing the temporary storage content. Accordingly, when the storage area is insufficient, it can be determined which of the storage areas is full or which of the storage areas must be ensured or protected. Thus, it is possible to prevent the content to be permanently stored from being deleted.

Referring to FIG. 3, when purchasing the digital media device, the content is not stored in the digital media device. However, the amount of the content stored in the device and the external input content gradually increase in time. Since the frequency of using the content depends on the user, the change pattern of the usage amount of the storage space varies. For example, in the case of a PVR, when a user records content of a predetermined amount everyday and watches the content on the weekend, the amount of the stored content gradually increases and, therefore, the change width of the graph is large. In addition, when the user records and deletes the content everyday, the change width of the graph is small.

Furthermore, when the content, which is stored for a long time, is repeatedly played without creating or inputting other content in a predetermined period, the temporary storage space may not be available.

Moreover, when the user deletes most content after repeatedly playing the content only in the predetermined period, changes the storage type of necessary contents to long-time storage content, and stores the necessary content, the amount of the content which is newly input or created is large, and thus the temporary storage space must be relatively large.

Accordingly, sizes of the temporary storage space and the long-time storage space may be varied according to the user's pattern of using the content.

An apparatus for managing content according to an exemplary embodiment of the present invention examines an average usage amount during the last N days in order to dynamically adjust the temporary storage space. In other words, an average of maximum values of the usage amount of the storage space used for storing the temporary storage content during the last N days is considered as the size of the storage space necessary for storing the temporary storage content.

In addition, the usage amount of the long-time storage space can be obtained by accumulating the amount of the long-time storage content.

In the graph, a critical threshold is set by the user. If the storage space is full, recording cannot be performed while securing the necessary storage space. Accordingly, the critical threshold is previously set such that the recording can be performed for 1 hour or 30 minutes and thus enough storage space for recording is previously secured before the storage space is full. The critical threshold may be internally determined by a system. The apparatus for managing content according to the exemplary embodiment of the present invention secures the storage space by periodically checking the usage amount of the storage space and deleting the stored content according to a predetermined criterion when the amount of the stored content reaches the critical threshold.

In FIG. 3, the amount of the content exceeds the critical threshold at two points ① and ②.

Point ① corresponds to the case where the sum of an average requirement amount of the temporary storage content according to the usage pattern of the user during N days and the amount of the content which is stored for a long time does not exceed the critical threshold. In other words, in consideration of the usual usage pattern of the user, the total amount of the necessary storage space does not exceed the critical threshold, but the temporary storage contents increase more than usual, and thus the total size of the data stored temporarily exceeds the critical threshold. Thus, the lack of the storage space can be solved by deleting only the temporary storage content. In the present exemplary embodiment, the average requirement amount of the temporary storage content is computed by calculating an average of the daily maximum values of the temporary storage content during the last N days.

Point ② represents the sum (hereinafter, referred to as average requirement capacity) of the average requirement amount of the temporary storage content according to the usage pattern of the user during N days, that is, the average of the daily maximum values of the temporary storage contents during N days, and the amount of the content which is stored for a long time exceeds the critical threshold. In other words, the amount of the storage space required by the user exceeds the critical threshold. In this case, since the amount of the long-time storage content is excessively large, the case where the amount of the storage space exceeds the critical threshold may appear again immediately although the temporary storage content is deleted in order to ensure the storage space. Accordingly, the long-time storage content must be inevitably deleted in order to prevent the storage space from being repeatedly full.

Figure 4:
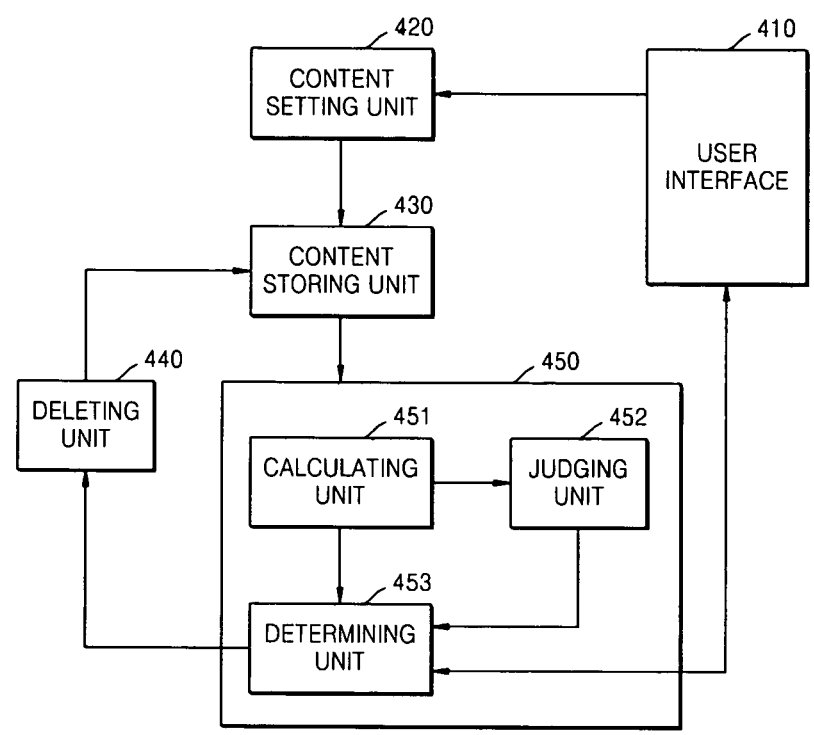
FIG. 4 illustrates a configuration of an apparatus for managing multimedia content according to an exemplary embodiment of the present invention.

FIG. 4 illustrates a configuration of an apparatus for managing multimedia content according to an exemplary embodiment of the present invention.

The apparatus for managing multimedia content according to the present exemplary embodiment includes a user interface 410, a content setting unit 420, a content storing unit 430, a deleting unit 440, and a content managing unit 450. The content managing unit 450 includes a calculating unit 451, a judging unit 452, and a determining unit 453.

When the content is created or input, the content setting unit 420 sets the content as long-time content or temporary storage content according to a user's instruction input through the user interface 410. The storage type of the content stored previously may be changed also.

The content storing unit 430 stores the multimedia content output from the content setting unit 420.

When the size of the data stored in the content storing unit 430 exceeds a predetermined critical threshold, the calculating unit 451 calculates an average of maximum values of the temporary storage content during the last N days and the size of the long-time storage content stored currently. The average of the maximum values of the temporary storage content is obtained, for example, by extracting and adding daily maximum values during the last seven days and dividing the sum of the daily maximum values by seven. Thus, it is preferable that the calculating unit 451 monitor the size of the data stored in the storing unit 430 and records the daily maximum values.

When the storage space is insufficient, the determining unit 453 determines which of the temporary storage content and the long-time storage content must be deleted in order to secure enough storage space. If an average requirement capacity calculated in the calculating unit 451 exceeds the critical threshold, it is determined that the long-time storage content should be deleted, otherwise, it is determined that the temporary storage content should be deleted.

In addition, when the value calculated in the calculating unit 451 exceeds the critical threshold, the determining unit 453 does not determine that the long-time content must be unconditionally deleted. In other words, the judging unit 452 determines whether the size of the long-time storage content exceeds a predetermined value, and, if the size of the long-time storage content does not exceed the predetermined value, it is determined that the temporary storage content should be deleted. Although the amount of the stored long-time storage content is small, if the change width of the temporary storage content during the last N days is large, the average requirement capacity may exceed the critical threshold. In this case, the long-time storage content should not be deleted.

Moreover, if the storage type of the content to be deleted is determined, the determining unit 453 determines the content to be deleted in the determined storage type of the content according to various criteria.

For example, the content to be deleted according to a priority rule can be selected based on a content size, the latest access date, a content creation date, a play count, and rating.

It may be preferable that the content having a large size, the content accessed long before the current date, the oldest content, or the content having a small play count be deleted in advance. Alternatively, the content may be deleted based on the rating determined by the user.

Additionally, quantified criteria may be created into metadata. Thus, by using appropriate weights and adding the weighted criteria, several criteria can be simultaneously applied.

The determining unit 453 can determine the content selected by the above-mentioned process as the content to be deleted. However, the determining unit 453 makes and provides a list of the selected content to the user and determines only the content selected using the user interface 410 as final contents to be deleted.

The deleting unit 440 deletes the content which is determined to be deleted by the determining unit 453 to secure enough storage space.

Figure 5:
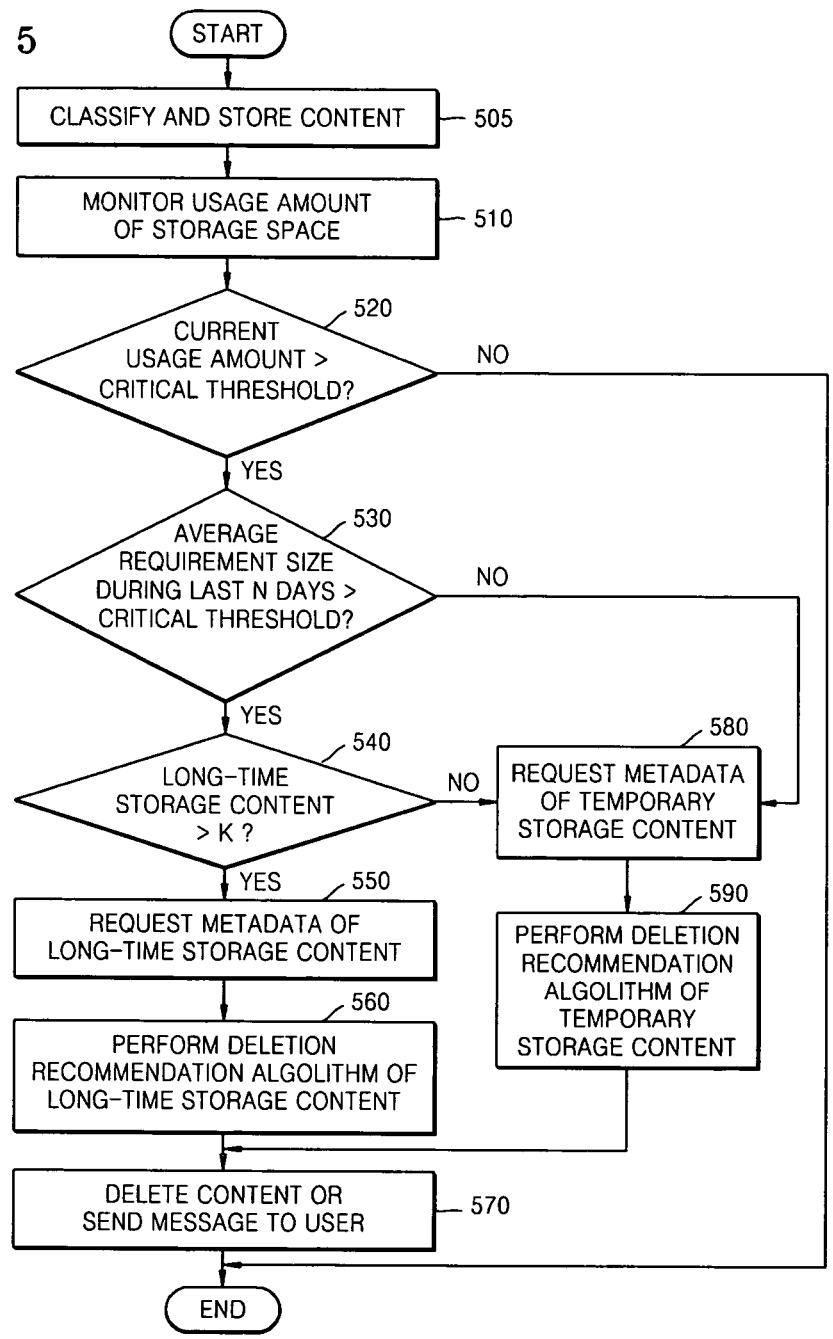
FIG. 5 is a flowchart illustrating a method of managing multimedia content according to an exemplary embodiment of the present invention.

FIG. 5 is a flowchart illustrating a method of managing multimedia content according to an exemplary embodiment of the present invention.

First, the content created by or input to the multimedia content device is classified as long-time storage content or temporary storage content and then stored according to a user's instruction (505). Thereafter, the usage amount of the storage space is monitored (510) and it is determined whether the total size of the stored data exceeds the critical threshold (520). Next, if it is determined that the total size of the stored data exceeds the critical threshold, it is determined whether the average requirement size, that is, the sum of the sizes of the long-time storage content and the average of the maximum values of the temporary storage content during the last N dates, exceeds the critical threshold (530). If it is determined that the average requirement size does not exceed the critical threshold, the content corresponding to various criteria are selected from the temporary storage content (590) with reference to the metadata of the temporary storage content (580). The selected content may be provided to the user or deleted without verification by the user (570).

Meanwhile, if it is determined that the size exceeds the critical threshold in operation 530, it is determined whether the size of the long-time storage content exceeds a predetermined value K (540). If it is determined that the size of the long-time storage content does not exceed the predetermined value K, operation 580 is executed. If it is determined that the size of the long-time storage content exceeds the predetermined value K, it is determined that the long-time storage content must be deleted (560) and the content is selected based on the various criteria with reference to the metadata of the long-time storage content (550). The process performed after selecting the content is similar to the process for the temporary storage content, and thus a detailed description will be omitted.

Figure 6:
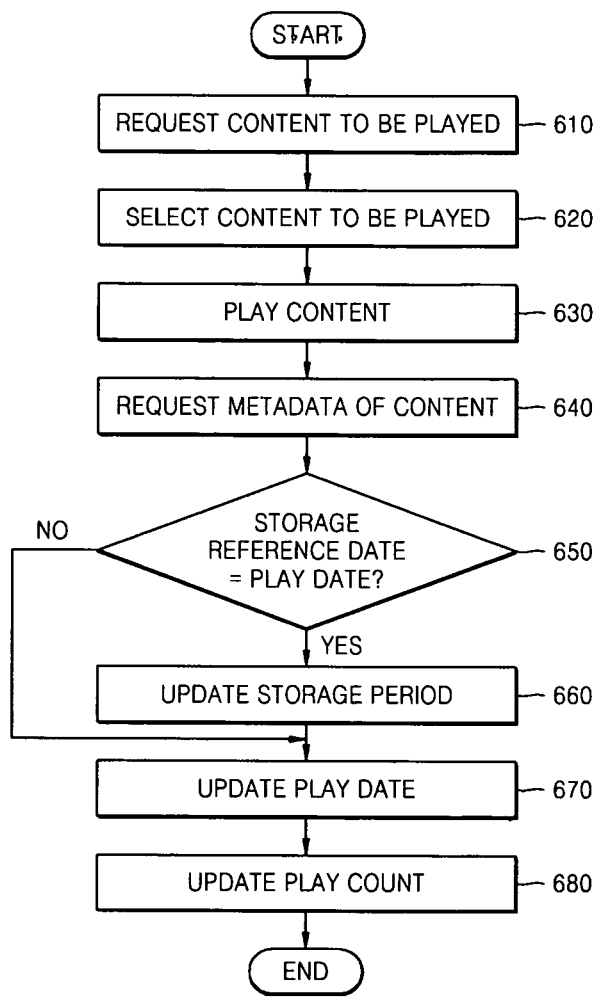
FIG. 6 is a flowchart illustrating a process of updating a storage period for the temporary storage of content according to an exemplary embodiment of the present invention.

FIG. 6 is a flowchart illustrating a process of updating a storage period of temporary storage content according to an exemplary embodiment of the present invention.

As mentioned above, since the storage period of the temporary storage content is set based on the storage reference date such as a play date or a creation date and the play date or the play count can be used as one of the various criteria for selecting the content to be deleted, the metadata including such information has to be updated.

When the content is requested, selected, and played according to the user's instruction (610, 620, and 630), the metadata related to the content is requested (640). It is determined whether the storage reference date is the play date with reference to the metadata (650). If it is determined that the storage reference date is the play date, related information such as the storage period, the play date, and the play count is updated (660, 670, and 680). If it is determined that the storage reference date is not the play date, that is, if the storage reference date is the content creation date, the metadata of the play date and the play count is updated (670 and 680), because the storage period is not changed by playing the content.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

According to the exemplary embodiments of the present invention, multimedia content is classified into content for which a storage period is set and content for which a storage period is not set and the content is then stored, the size of the content occupying a storage space in each storage type is automatically calculated to analyze a user's pattern of using the storage space when the storage space is insufficient, and content to be deleted is selected according to the analyzed pattern. Thus, it is possible to prevent the content which the user does not want to delete from being deleted and to eliminate the need for the user to individually manage the contents.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of managing multimedia content including a first type of stored content and a second type of stored content, the method comprising:
   calculating, when a first sum of a size of the first type of stored content in which a storage period is not set, and a size of the second type of stored content in which a storage period is set exceeds a first critical threshold, a second sum of the size of an average of maximum sizes of the second type of stored content during a predetermined period before the first sum exceeds the first critical threshold and the size of the first type of stored content; and
   deleting multimedia content which is classified as the second type of stored content when the calculated second sum does not exceed the first threshold.

2. The method of claim 1, further comprising deleting multimedia content which is classified as the first type of stored content when the calculated second sum exceeds the first threshold.

3. The method of claim 1, further comprising
   determining whether the size of the first type of stored content exceeds a second critical threshold if the calculated second sum exceeds the first critical threshold, delete multimedia content which is classified as the first type of stored content when the size of the first type of stored content exceeds the second critical threshold, and delete multimedia content which is classified as the second type of stored content when the size of the first type of stored content does not exceed the second critical threshold.

4. The method of claim 1, wherein the deleting the multimedia content which is classified as the second type of stored content comprises:

selecting content to be deleted from among the second type of stored content according to a specific rule; and deleting the selected content.

5. The method of claim 4, wherein the selecting content to be deleted comprises:

providing a user with a list of content selected according to the specific rule; and selecting the content to be deleted from the content contained in the list according to a user's instruction.

6. The method of claim 4, wherein the specific rule specifies that content having a largest size is to be deleted among the second type of stored content.

7. The method of claim 4, wherein the specific rule specifies that content having an oldest play date is to be deleted among the second type of stored content.

8. The method of claim 4, wherein the specific rule specifies that content having a smallest play count is to be deleted among the second type of stored content.

9. A non-transitory computer-readable medium having embodied thereon a computer program for performing a method of claim 1.

10. An apparatus for managing multimedia content, the apparatus comprising:

a memory comprising a content storing unit which stores the multimedia content including a first type of stored content and a second type of stored content;

a microcomputer coupled to the memory, the microcomputer comprising:

a content managing unit which calculates, when a first sum of a size of the first type of stored content in which a storage period is not set and a size of the second type of stored content in which a storage period is set exceeds a first critical threshold, a second sum of an average of maximum sizes of the second type of stored content during a predetermined period before the first sum exceeds the first critical threshold and the size of the first type of stored content, and a deleting unit which deletes multimedia content which is classified as the second type of stored content when the calculated second sum does not exceed the first threshold.

11. The apparatus of claim 10, wherein the deleting unit deletes multimedia content which is classified as the first type of stored content when the calculated second sum exceeds the first threshold.

12. The apparatus of claim 10, wherein the content managing unit determines whether the size of the first type of stored content exceeds a second critical threshold if the second sum exceeds the first critical threshold, and wherein the deleting unit deletes the first type of content if the size of the first type of stored content exceeds the second critical threshold, and deletes the second type of stored content if the size of the first type of content does not exceed the second critical threshold.

13. The apparatus of claim 10, wherein the deleting unit selects content to be deleted from the second type of stored content according to a specific rule, and the deleting unit deletes the selected content.

14. The apparatus of claim 10, wherein the deleting unit provides a user with a list of content selected according to a specific rule, and selects the content to be deleted from the content contained in a list of content according to a user's instruction, and the deleting unit deletes the selected content.

15. The apparatus of claim 13, wherein the specific rule specifies that content having a largest size is to be deleted first among the second type of stored content.

16. The apparatus of claim 13, wherein the specific rule specifies that content having an oldest play date is to be deleted first among the second type of stored content.

17. The apparatus of claim 13, wherein the specific rule specifies that content having a smallest play count is to be deleted first among the second type of stored content.

18. The method of claim 1, wherein the size of the second type of stored content changes during the predetermined period before the first sum exceeds the first critical threshold in a way that at least two times of maximum sizes of the second type of stored content occurs, and wherein the average of maximum sizes of the second type of stored content is the average of the at least two times of maximum sizes of the second type of stored content that occurs during the predetermined period before the first sum exceeds the first critical threshold.

* * * * *